(12) United States Patent
Tinnakornsrisuphap et al.

(10) Patent No.: US 12,477,488 B2
(45) Date of Patent: Nov. 18, 2025

(54) END-TO-END TIME SYNCHRONIZATION FOR CLOUD-BASED SERVICES

(71) Applicant: QUALCOMM Incorporated, San Diego, CA (US)

(72) Inventors: Peerapol Tinnakornsrisuphap, San Diego, CA (US); Vinay Melkote Krishnaprasad, Bangalore (IN); Prashanth Haridas Hande, San Diego, CA (US); Ravi Agarwal, San Diego, CA (US); Hemanth Sampath, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 424 days.

(21) Appl. No.: 17/997,261

(22) PCT Filed: Jun. 2, 2021

(86) PCT No.: PCT/US2021/035437
§ 371 (c)(1),
(2) Date: Oct. 27, 2022

(87) PCT Pub. No.: WO2022/005680
PCT Pub. Date: Jan. 6, 2022

(65) Prior Publication Data
US 2023/0171720 A1    Jun. 1, 2023

(30) Foreign Application Priority Data
Jul. 3, 2020    (IN) .............................. 202041028396

(51) Int. Cl.
*H04W 56/00*   (2009.01)
*H04J 3/06*    (2006.01)

(52) U.S. Cl.
CPC ....... *H04W 56/0015* (2013.01); *H04J 3/0667* (2013.01)

(58) Field of Classification Search
CPC ......... H04W 56/0015; H04W 36/0061; H04W 36/08; H04J 3/0667; H04J 3/0661; A63F 13/355; H04L 7/0008; H04N 21/4305
(Continued)

(56) References Cited

U.S. PATENT DOCUMENTS

| 8,719,452 B1 | 5/2014 | Ding et al. |
| 2003/0045302 A1* | 3/2003 | Oda ..................... G01S 19/252 455/456.1 |

(Continued)

FOREIGN PATENT DOCUMENTS

| CN | 101656606 A | 2/2010 |
| CN | 106330420 A | 1/2017 |

(Continued)

OTHER PUBLICATIONS

International Search Report and Written Opinion—PCT/US2021/035437—ISA/EPO—Oct. 19, 2021.
(Continued)

*Primary Examiner* — Ricardo H Castaneyra
(74) *Attorney, Agent, or Firm* — Patterson+ Sheridan, L.L.P.

(57) ABSTRACT

Certain aspects of the present disclosure provide techniques for communicating time synchronized data between a client and a server. An example method generally includes synchronizing, by a client, a clock of the client with a clock source. The method also includes transmitting, from the client to a server, at an application level, information indicating the clock source, a cell identifier of a serving cell of the client, and accuracy of the clock source as a time value. The method further includes transmitting, from the client to
(Continued)

the server, a message including data and a timestamp correlated to an event associated with the data based on the clock. The method also includes in response to the message, receiving, by the client from the server, generated data.

26 Claims, 11 Drawing Sheets

(58) Field of Classification Search
USPC ....... 370/329, 503, 509, 311, 328, 331, 332; 455/456.1, 13.2, 456.6
See application file for complete search history.

(56) References Cited

U.S. PATENT DOCUMENTS

| | | |
|---|---|---|
| 2003/0130040 A1 | 7/2003 | Dripps |
| 2004/0125822 A1* | 7/2004 | Jun .................. H04J 3/0673 370/503 |
| 2005/0283820 A1* | 12/2005 | Richards .......... H04N 21/41415 725/146 |
| 2009/0137250 A1* | 5/2009 | Kurimoto ........... H04W 36/324 455/436 |
| 2010/0099434 A1 | 4/2010 | Murayama et al. |
| 2011/0026486 A1* | 2/2011 | Hapsari .................. H04W 8/20 370/331 |
| 2014/0153402 A1 | 6/2014 | Rubin et al. |
| 2022/0110076 A1* | 4/2022 | Shimoda ............ H04W 72/0446 |
| 2022/0264394 A1* | 8/2022 | Wang ................ H04W 36/0061 |

FOREIGN PATENT DOCUMENTS

| | | |
|---|---|---|
| CN | 107079193 A | 8/2017 |
| TW | 201929581 A | 7/2019 |

OTHER PUBLICATIONS

Qualcomm Incorporated: "MI-EMO DASH Robustness", 3GPP Draft_26346_CR0433R1_(REL-12)_S4-141404, 3GPP TSG-SA4 Meeting #81, 3rd Generation Partnership Project (3GPP), Mobile Competence Centre, 650, Route Des Lucioles, F-06921 Sophia-Antipolis Cedex, France, vol. SA WG4, Dec. 7, 2014 (Dec. 7, 2014), XP050901622, 3 Pages, the whole document.

Qualcomm Incorporated: "Proposed Updates to Baseline Technologies", S4-200042, TSG SA4#107 meeting, Brd Generation Partnership Project, Mobile Competence Centre, 650, Route Des Lucioles, F-06921 Sophia-Antipolis Cedex, France, vol. SA WG4, No. Wroclaw, Poland, Jan. 20, 2020-Jan. 24, 2020, Jan. 14, 2020, XP051843521, 38 Pages.

Taiwan Search Report—TW110120187—TIPO—Dec. 8, 2024.

* cited by examiner

END-TO-END TIME SYNCHRONIZATION FOR CLOUD-BASED SERVICES

CROSS-REFERENCE TO RELATED APPLICATION(S)

This application is a national stage application under 35 U.S.C. 371 of PCT/US2021/035437, filed Jun. 2, 2021, which claims benefit of and priority to Indian Provisional Application No. 202041028396, filed Jul. 3, 2020, which are hereby assigned to the assignee hereof and hereby expressly incorporated by reference herein in their entireties as if fully set forth below and for all applicable purposes.

FIELD OF THE DISCLOSURE

Aspects of the present disclosure relate to wireless communications, and more particularly, to techniques for communicating time synchronized data between a client and a server.

DESCRIPTION OF RELATED ART

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include synchronized rendering at the server and/or synchronized display at the client, time-based allocation of resources at the server, or timestamping data or events from the server.

Certain aspects of the subject matter described in this disclosure can be implemented in a method for communicating time synchronized data between a client and a server by a user equipment (UE). The method generally includes synchronizing, by a client, a clock of the client with a clock source. The method also includes transmitting, from the client to a server, at an application level, information indicating the clock source, a cell identifier of a serving cell of the client, and accuracy of the clock source as a time value. The method further includes transmitting, from the client to the server, a message including data and a timestamp correlated to an event associated with the data based on the clock. The method also includes in response to the message, receiving, by the client from the server, generated data.

Certain aspects of the subject matter described in this disclosure can be implemented in a method for communicating time synchronized data between a client and a server by the server. The method includes receiving, by a server from a client, at an application level, information indicating a clock source used by the client for synchronization of a clock of the client, a cell identifier of a serving cell of the client, accuracy of the clock source as a time value. The method also includes receiving, by the server from the client, a message including data and a timestamp correlated to an event associated with the data based on the clock. The method further includes in response to the message, generating, by the server, client data based on the information, the data, and the timestamp. The method also includes transmitting, from the server to the client, the client data.

Certain aspects of the subject matter described in this disclosure can be implemented in an apparatus for communicating time synchronized data between the apparatus and a server. The apparatus generally includes a processor configured to synchronize a clock of the apparatus with a clock source and a memory coupled to the processor. The apparatus also includes a transmitter configured to: transmit, to a server, at an application level, information indicating: the clock source, a cell identifier of a serving cell of the apparatus, and accuracy of the clock source as a time value. The transmitter is further configured to transmit, to the server, a message including data and a timestamp correlated to an event associated with the data based on the clock. The apparatus further includes a receiver configured to receive, in response to the message from the server, generated data.

Certain aspects of the subject matter described in this disclosure can be implemented in an apparatus for communicating time synchronized data between a client and the apparatus. The apparatus generally includes a receiver configured to: receive, from a client, at an application level, information indicating: a clock source used by the client for synchronization of a clock of the client, a cell identifier of a serving cell of the client, and accuracy of the clock source as a time value. The receiver is further configured to receive, from the client, a message including data and a timestamp correlated to an event associated with the data based on the clock. The apparatus also includes a processor configured to generate, in response to the message, client data based on the information, the data, and the timestamp and a memory coupled to the processor. The apparatus further includes a transmitter configured to transmit, to the client, the client data.

Certain aspects of the subject matter described in this disclosure can be implemented in an apparatus for communicating time synchronized data between the apparatus and a server. The apparatus generally includes means for synchronizing, by the apparatus, a clock of the apparatus with a clock source. The apparatus also includes means for transmitting, from the apparatus to a server, at an application level, information indicating: the clock source, a cell identifier of a serving cell of the apparatus, and accuracy of the clock source as a time value. The apparatus further includes means for transmitting, from the apparatus to the server, a message including data and a timestamp correlated to an event associated with the data based on the clock. The apparatus also includes means for receiving, in response to the message, by the apparatus from the server, generated data.

Certain aspects of the subject matter described in this disclosure can be implemented in an apparatus for communicating time synchronized data between a client and the apparatus. The apparatus generally includes means for receiving, by the apparatus from a client, at an application level, information indicating: a clock source used by the client for synchronization of a clock of the client, a cell identifier of a serving cell of the client, and accuracy of the clock source as a time value. The apparatus also includes means for receiving, by the apparatus from the client, a message including data and a timestamp correlated to an event associated with the data based on the clock. The apparatus further includes means for generating, in response to the message, by the apparatus, client data based on the information, the data, and the timestamp. The apparatus also includes means for transmitting, from the apparatus to the client, the client data.

Certain aspects of the subject matter described in this disclosure can be implemented in a computer readable medium having instructions stored thereon for synchronizing, by a client, a clock of the client with a clock source; transmitting, from the client to a server, at an application level, information indicating: the clock source, a cell identifier of a serving cell of the client, and accuracy of the clock source as a time value; transmitting, from the client to the server, a message including data and a timestamp correlated to an event associated with the data based on the clock; and in response to the message, receiving, by the client from the server, generated data.

Certain aspects of the subject matter described in this disclosure can be implemented in a computer readable medium having instructions stored thereon for receiving, by a server from a client, at an application level, information indicating: a clock source used by the client for synchronization of a clock of the client, a cell identifier of a serving cell of the client, and accuracy of the clock source as a time value; receiving, by the server from the client, a message including data and a timestamp correlated to an event associated with the data based on the clock; in response to the message, generating, by the server, client data based on the information, the data, and the timestamp; and transmitting, from the server to the client, the client data.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
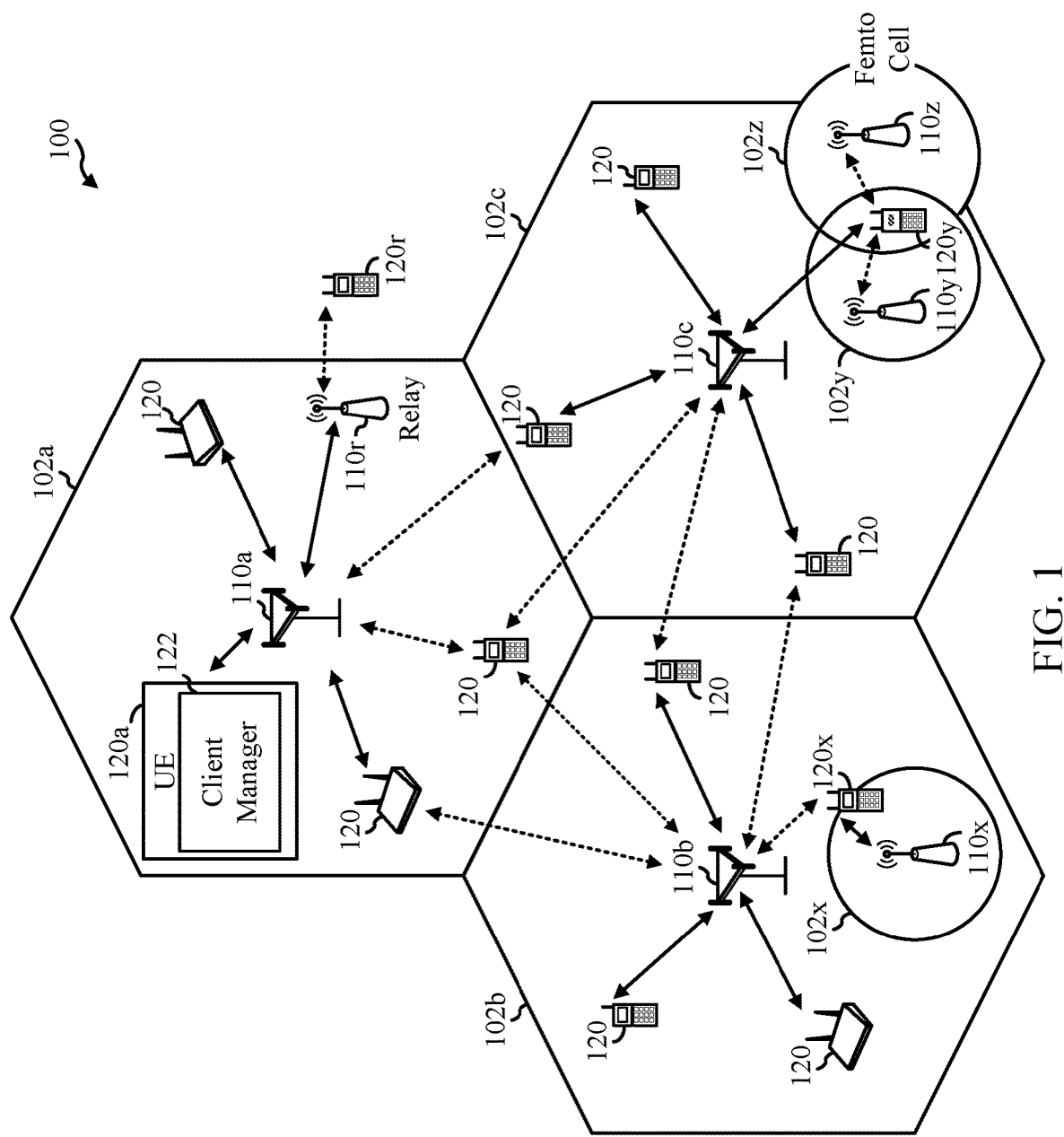
FIG. 1 is a block diagram conceptually illustrating an example wireless communication network, in accordance with certain aspects of the present disclosure.
Figure 1:
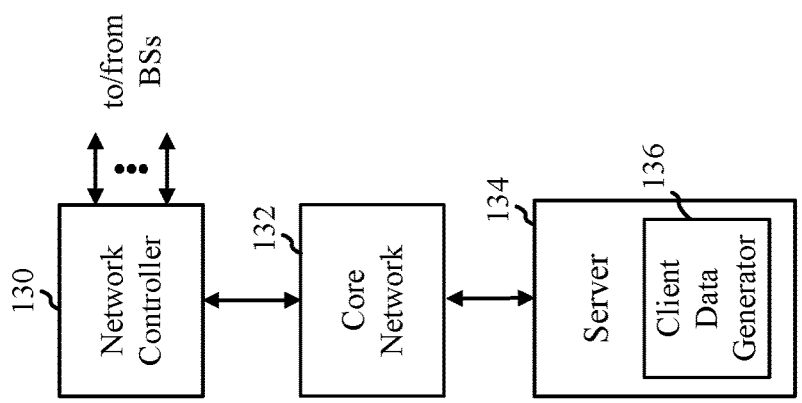

Aspects of the present disclosure provide apparatus, methods, processing systems, and computer readable mediums for communicating time synchronized data between a client and a server. A client may transmit, to the server, at an application level (e.g., via a client application which interfaces with the server) information related to the clock synchronization of the client, such as the clock source that the client will use for the client application. In certain cases, the clock source may be time information that the client receives from a radio access network (RAN), such as the time information in System Information Block-9 (SIBB9) in a 5G NR system or SIB16 in an E-UTRA system. That is, the clock source may be a cellular clock specific to a wireless network, such as a clock maintained at the RAN and provided to the client. As the client updates the server with various data (such as controller input or pose information), the client may provide the server with timestamps relative to the clock source of the client. With the timestamps, the server may synchronize various actions based on the timestamps received from the UE. That is, the timestamps from the UE may provide end-to-end synchronization between the UE and server.

The following description provides examples of synchronization of data between a client and server in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth (e.g., 80 MHz or beyond), millimeter wave (mmW) targeting high carrier frequency (e.g., e.g., 24 GHz to 53 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe. NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (e.g., a 5G NR network) or an Evolved Universal Terrestrial Radio Access (E-UTRA) system (e.g., an LTE network).

The UE 120a includes a client manager 122 that provides data (such as pose information and/or controller input) with timestamps to a server, where the timestamps are synchronized to a certain clock source, in accordance with aspects of the present disclosure. The server 134 includes a data generator 136 that generates client data based at least in part on the data from the UE 120a and the timestamps.

As illustrated in FIG. 1, the wireless communication network 100 may include a number of BSs 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. ABS may support one or multiple cells.

The BSs 110 communicate with UEs 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may be in communication with a set of BSs 110 and provide coordination and control for these BSs 110 (e.g., via a backhaul). In aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

The core network 132 may be in communication with the server 134, such that the core network 132 serves as a packet gateway for providing the UE 120*a* with access to the server 134. The core network 132 may include various servers and networking devices, such as switches, routers, and gateways. The server 134 may be a computer, computing device, or processing system that provides a service (e.g., split extended reality (XR) rendering of video frames, audio streams, and/or haptic feedback) to a client, such as the UE 120*a*. As further described herein with respect to FIG. 3, split XR may offload the rendering of various content or data (e.g., video and/or audio streams) from the UE 120 to a server (e.g., the server 134) with high-powered processors (e.g., graphics processing units (GPUs)) for virtual reality (VR), augmented reality (AR), or mixed reality (MR) applications. While the server 134 is depicted as a separate server entity in communication with the core network 132 to facilitate understanding, aspects of the present disclosure may be applied to the server 134 being integrated or co-located with the core network 132, network controller 130, and/or BS 110*a*.

Figure 2:
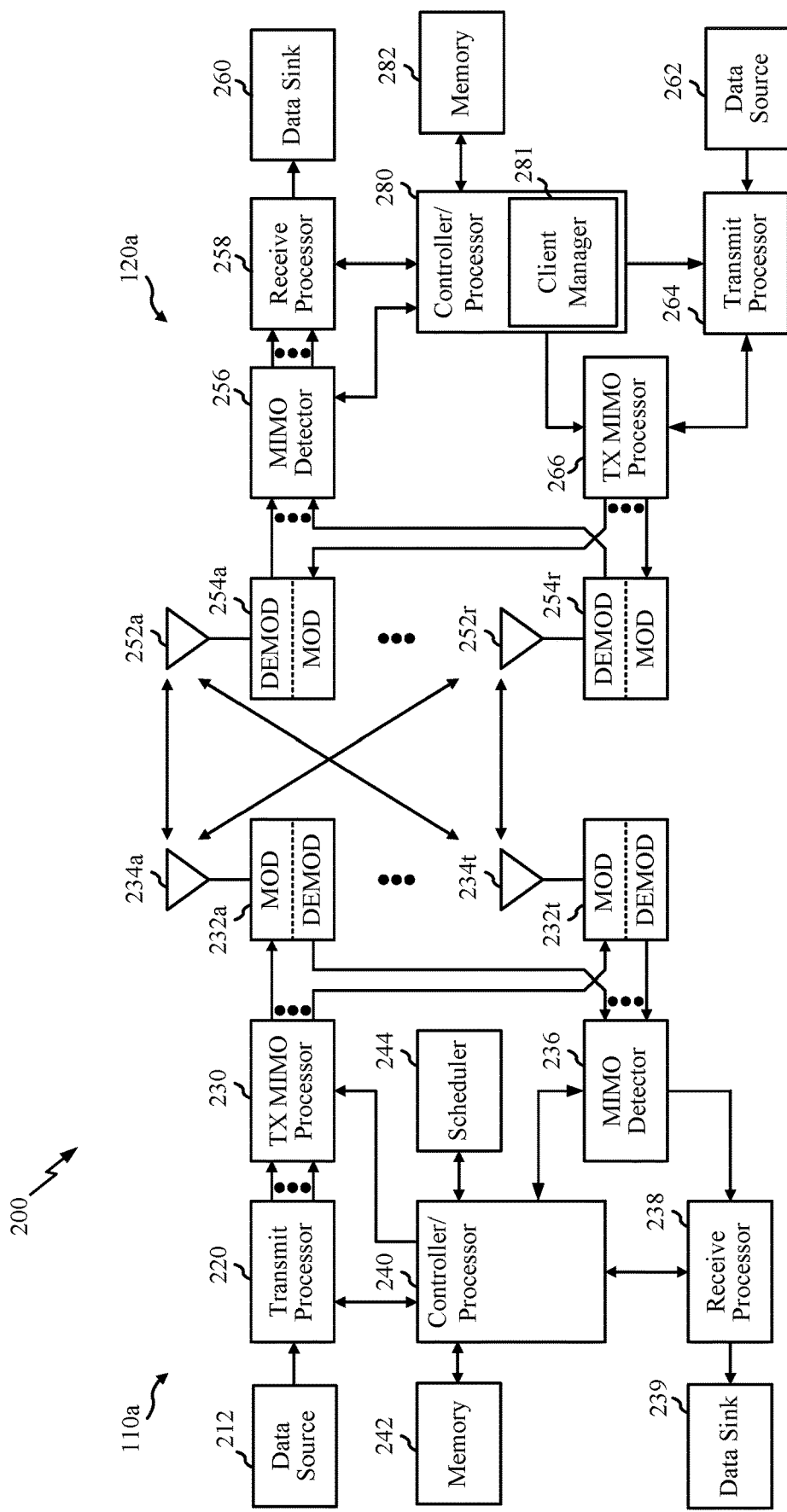
FIG. 2 is a block diagram conceptually illustrating a design of an example a base station (BS) and user equipment (UE), in accordance with certain aspects of the present disclosure.

FIG. 2 illustrates example components of BS 110*a* and UE 120*a* (e.g., the wireless communication network 100 of FIG. 1), which may be used to implement aspects of the present disclosure.

At the BS 110*a*, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), PBCH demodulation reference signal (DMRS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232*a*-232*t*. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232*a*-232*t* may be transmitted via the antennas 234*a*-234*t*, respectively.

At the UE 120*a*, the antennas 252*a*-252*r* may receive the downlink signals from the BS 110*a* and may provide received signals to the demodulators (DEMODs) in transceivers 254*a*-254*r*, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254*a*-254*r*, perform MIMO detection on the received symbols if applicable, and provide detected symbols. A receive processor 258 may process (e.g., demodulate, deinterleave, and decode) the detected symbols, provide decoded data for the UE 120*a* to a data sink 260, and provide decoded control information to a controller/processor 280.

On the uplink, at UE 120*a*, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254*a*-254*r* (e.g., for SC-FDM, etc.), and transmitted to the BS 110*a*. At the BS 110*a*, the uplink signals from the UE 120*a* may be received by the antennas 234, processed by the modulators 232, detected by a MIMO detector 236 if applicable, and further processed by a receive processor 238 to obtain decoded data and control information sent by the UE 120*a*. The receive processor 238 may provide the decoded data to a data sink 239 and the decoded control information to the controller/processor 240.

The memories 242 and 282 may store data and program codes for BS 110*a* and UE 120*a*, respectively. A scheduler 244 may schedule UEs for data transmission on the downlink and/or uplink.

Antennas 252, processors 266, 258, 264, and/or controller/processor 280 of the UE 120*a* and/or antennas 234, processors 220, 230, 238, and/or controller/processor 240 of the BS 110*a* may be used to perform the various techniques and methods described herein. As shown in FIG. 2, the controller/processor 280 of the UE 120*a* has a client manager 281 that provides data (such as pose information and/or controller input) with timestamps to a server, where the timestamps are synchronized to a certain clock source, according to aspects described herein. Although shown at the controller/processor, other components of the UE 120*a* and BS 110*a* may be used to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
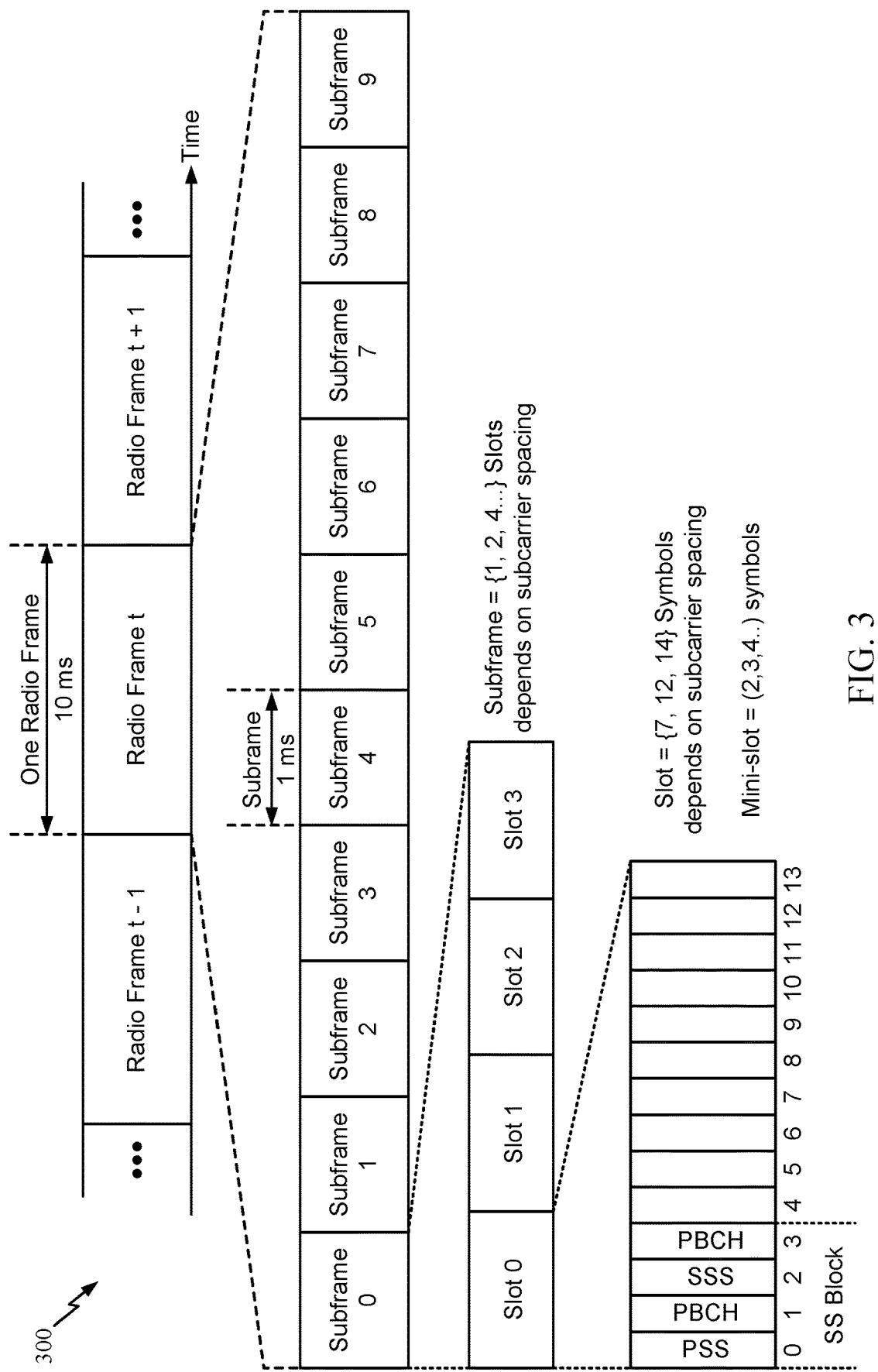
FIG. 3 is an example frame format for certain wireless communication systems (e.g., new radio (NR)), in accordance with certain aspects of the present disclosure.
Figure 4:
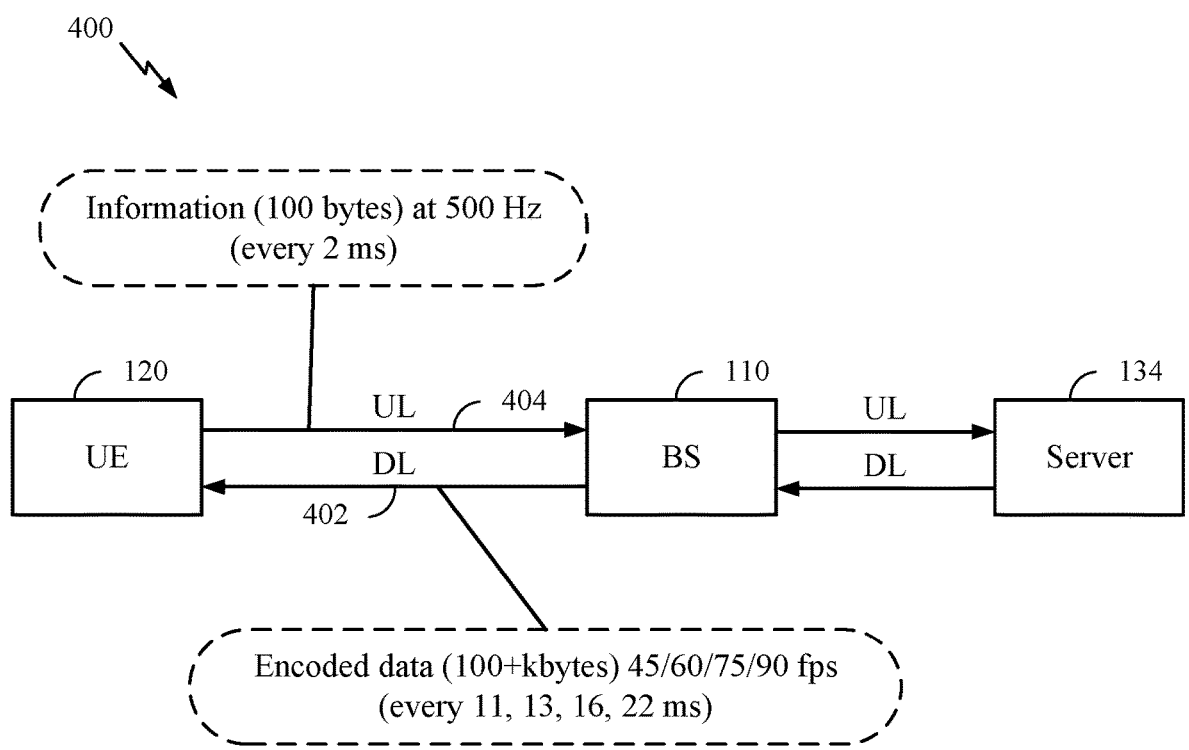
FIG. 4 is a diagram illustrating an example environment in which a UE may communicate with a server through a cloud-based service or session, in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7, 12, or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SSB can be transmitted up to sixty-four times, for example, with up to sixty-four different beam directions for mmWave. The multiple transmissions of the SSB are referred to as a SS burst set. SSBs in an SS burst set may be transmitted in the same frequency region, while SSBs in different SS bursts sets can be transmitted at different frequency regions.

Certain cloud-based services (such as split XR) may offload the rendering of various content or data (e.g., video and/or audio streams) to servers with high-powered processors (e.g., graphics processing units (GPUs)). In certain cases, a head mount display (HMD) may be equipped with a wireless modem, which provides access to a wireless communication network (e.g., the wireless communication network 100) and enables a split XR session to be wirelessly streamed between the HMD and a server. For example, FIG. 3 is a diagram illustrating an example environment 400 in which a UE may communicate with a server through a cloud-based service or session. As shown, the UE 120 may receive various generated content 402 (e.g., encoded video stream(s), encoded audio stream(s), and/or instructions for haptic feedback) from the server 134 through a radio access network (RAN), such as the BS 110 and/or network controller 130. For example, the server 134 may send the generated content 402 on a periodic basis (e.g., every 11, 13, 16, or 22 ms) at a high throughput level (e.g., >100 kilobytes). The UE 120 may send various information 404 to the server 134 through the BS 110. For example, the UE 120 may send the information 404 on a periodic basis (e.g., every 2 ms) at relatively low throughput level (e.g., 100 bytes). The information may be pose information (e.g., the orientation of the user's head relative to a coordinate system) and/or control information (e.g., information from an input device such as a gamepad, controller, or wand). In certain aspects, the server 134 may generate the content 402 based on the information 404. In an XR setting, the UE 120 may display the generated content to the user as a sequence of video frames in an HMD.

A split XR session may have various traffic flow characteristics to provide an acceptable XR experience to the user (i.e., an immersive, realistic, and comfortable experience). For example, a split XR session may have a low-latency (e.g., 5-20 ms delay) between the UE and server, a highly reliable bit error rate (e.g., a packet error rate (PER) of less than or equal to $10^{-3}$), high downlink throughputs (100-600 Mbit/s or 1-2.5 Gbit/s or higher), and periodic low downlink throughputs (e.g., <1 Mbps). As used herein, split XR may include various low-latency cloud-based services such as cloud gaming, split rendering, split computation, virtual reality (VR), augmented reality (AR), or mixed reality (MR).

Example End-to-End Time Synchronization for Cloud-based Services

Under certain low-latency cloud-based services (such as split XR), a server (e.g., the server 134) and UE (e.g., the UE 120a) may not be time synchronized with each other. That is, the server and UE may not share the same reference clock. In certain cases, the server and UE may run on independent or separate clocks. For example, the UE may be synchronized with a certain clock, such as a reference clock specific to a wireless network or a global navigation satellite system (e.g., Global Positioning System (GPS), GLObal NAvigation Satellite System (GLONASS), or Galileo), and the server may be synchronized with a separate clock, such as a precision time protocol (PTP) server or a network time protocol (NTP) server. In certain cases, the server may be synchronized with a certain clock, and the UE may not be synchronized.

Aspects of the present disclosure provide various apparatus and methods for providing end-to-end time synchronization for cloud-based services, such as split XR or other low-latency cloud-based services. For example, a UE may transmit, to the server, at an application level (e.g., via a client application which interfaces with the server) information related to the clock synchronization of the UE, such as the clock source that the UE will use for the client application. In certain cases, the clock source may be time information that the UE receives from the RAN (e.g., the time information in System Information Block-9 (SIB9) in a 5G NR system or SIB16 in an E-UTRA system). That is, the clock source may be a cellular clock specific to a wireless network, such as a clock maintained at the RAN and provided to the UE. As the UE updates the server with various data (such as controller input or pose information), the UE may provide the server with timestamps relative to the clock source of the UE. With the timestamps, the server may synchronize various actions based on the timestamps received from the UE. That is, the timestamps from the UE may provide end-to-end synchronization between the UE and server.

In certain aspects, the end-to-end synchronization between the UE and server may enable various advantages for the cloud-based service. For example, the end-to-end synchronization may enable synchronized rendering at the server and/or synchronized display at the UE, as further described herein with respect to FIG. 9A. In certain aspects, the end-to-end synchronization may enable timestamping data or events from the server, such as displaying the synchronized time within the virtual environment, initiating feedback at a certain time, etc. In aspects, the end-to-end synchronization may allow the server to spread various resources (such as computational or processing resources or network traffic capacity) over time for users (e.g., UEs/HMDs), as further described herein with respect to FIG. 9B. For example, spreading computational resources (e.g., GPU computations or rendering, memory, processing time, etc.) over time for different users may facilitate efficient use of the computational resources without overloading the server at certain times. As another example, spreading out the network traffic of users over time may enable efficient use of the network capacity (e.g., bandwidth), so as not to overburden the network capacity and provided rendered content to a certain number of users.

Figure 5:
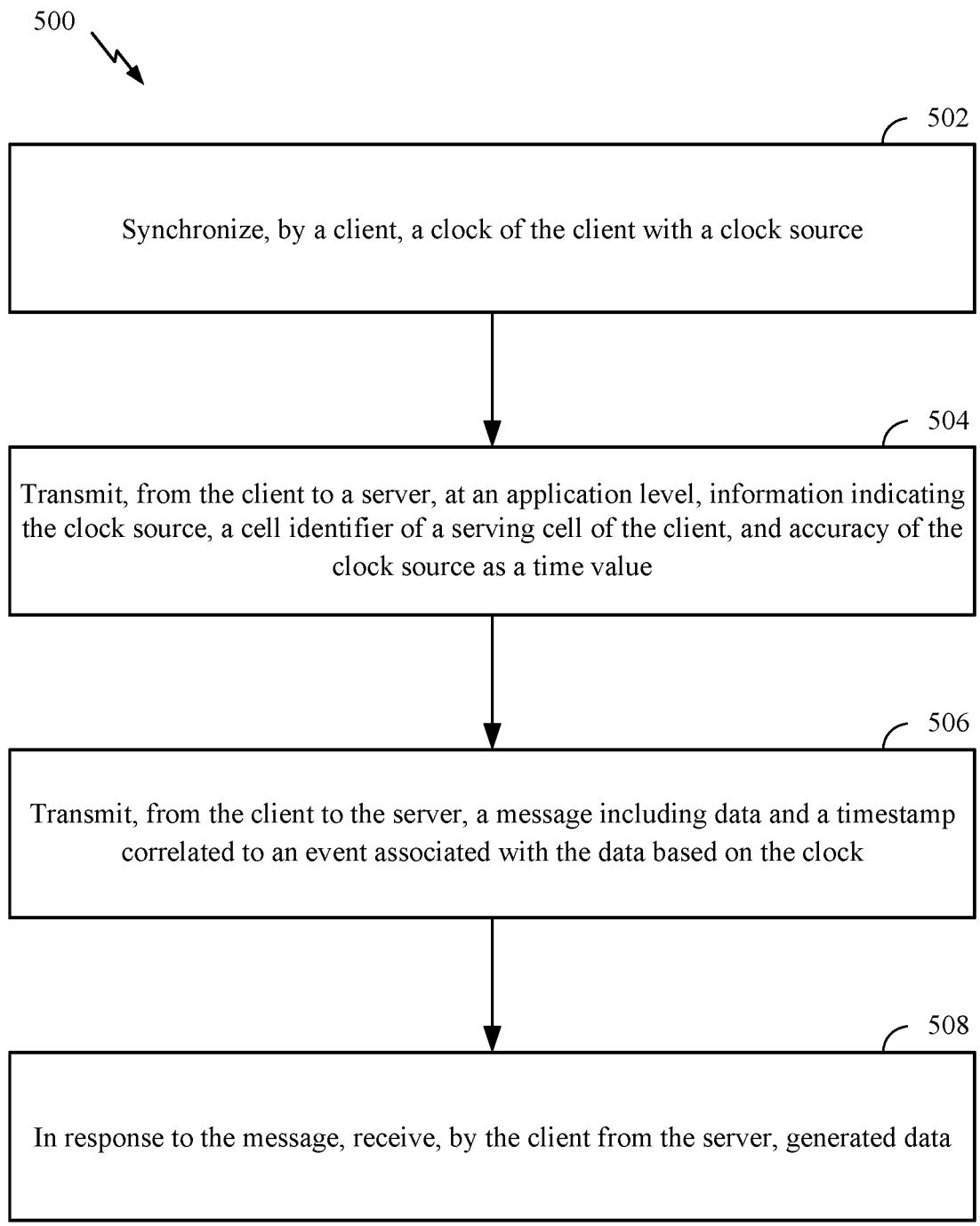
FIG. 5 is a flow diagram illustrating example operations for communicating time synchronized data between a client and a server by a client, in accordance with certain aspects of the present disclosure.

FIG. 5 is a flow diagram illustrating example operations 500 for communicating time synchronized data between a client and a server, in accordance with certain aspects of the present disclosure. The operations 500 may be performed, for example, by a user equipment (e.g., the UE 120a in the wireless communication network 100). The operations 500 may be implemented as software components that are executed and run on one or more processors (e.g., controller/processor 280 of FIG. 2). Further, the transmission and reception of signals by the UE in the operations 500 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 500 may begin at 502, where a client (e.g., the UE 120a) synchronizes a clock of the client with a clock source. At 504, the client may transmit, to a server (e.g., the server 134), at an application level, information indicating the clock source, a cell identifier of a serving cell of the client, accuracy of the clock source as a time value. At 506, the client may transmit, to the server, a message including data and a timestamp correlated to an event associated with the data based on the clock. At 508, the client may receive, from the server, generated data in response to the message at 506.

In certain aspects, the client may be a wireless communication device such as a UE. In certain cases, the client may be a client application (such as a process, thread, a user-space application, or a service application) running on the UE, and the client application may generate various data (e.g., pose information, controller input, sensor measurements, etc.) for the UE to transmit to the RAN, which forwards the data to the server. That is, the UE may transmit the data generated by the client to the server via a wireless network such as the wireless communication network 100.

As used herein, an application level (or layer) may refer to a layer of a protocol stack in which the application layer is the topmost layer, and the remaining layers include a Packet Data Convergence Protocol (PDCP) layer, a Radio Link Control (RLC) layer, a Medium Access Control (MAC) layer, and a Physical (PHY) layer, in descending order. For example, the application level may be the level in which the payload for the protocol stack in a user plane is generated. The payload may be processed at various layers (e.g., the PDCP layer, RLC layer, MAC layer, and PHY layer) to enable transmission of the payload over wireless resources (e.g., frequency-time resources). In certain aspects, the application level may include Session Initiation Protocol (SIP) signaling used to establish, maintain, or terminate a real-time session between the client and server.

In certain aspects, synchronization of the clock at 502 may involve the client selecting a clock source (for example, among various sources) for the clock of the client and setting the clock based on the clock source. In certain cases, setting the clock based on the clock source may involve deriving a timestamp based on an internal clock of the client relative to the clock source. For example, the client may obtain time information (such as a time reference) from the clock source and derive the timestamp by adding a certain time delta to the time reference, where the time delta is derived by measuring the time duration between the time reference of the clock source and the timestamp using the internal clock of the client.

With respect to the timestamp, the event associated with the data may include a transmission time of the message at 506, when the data was generated by the client, or when an event or measurement included in the data occurred (for example, the data may include controller input, and the timestamp may be correlated to when a user interacts with a controller such as pressing a button or moving a joystick). In certain cases, the clock of the client may be used to tag various data generated by the client (such as pose information, sensor measurements, or controller input) with timestamps from the clock (e.g., derived from the clock source). For example, pose information may be tagged with a timestamp from the clock to indicate when the pose information was generated by the client. That is, the timestamp may be correlated to when the data is generated by the client or when a certain event occurs (e.g., when a user interacts with a controller such as pressing a button or moving a joystick) based on the clock.

The clock source may be various reference clocks that provide time information. For example, the clock source may be one of a satellite based positioning system (e.g., GPS, GLONASS, or Galileo), a cellular clock, a PTP, or NTP. The satellite based positioning systems may provide an accuracy of in the range of microseconds or nanoseconds (e.g., ≤40 ns). The cellular clock may provide an accuracy in the range of microseconds (e.g., 1.5 µs), or in certain cases up to 10 milliseconds. PTP may provide an accuracy in the range of microseconds or nanoseconds (e.g., 100 ns). NTP may provide an accuracy in the range of milliseconds or seconds (e.g., 1 ms). In certain cases, the clock source of the operations 500 may include multiple clock sources. In certain aspects, the cellular clock may be used for certain low-latency cloud-based services (such as split XR) due to its reliability indoors (e.g., as compared to a satellite based system), support in certain wireless communication networks, its high accuracy, and/or its low or no network jitter.

As an example, the clock source may be a cellular clock, and synchronizing the clock of the client may include receiving, by the client from a base station (e.g., the base station 110), time information based on the base station being time synchronized with the server. For instance, the time information from the base station may be a time field (e.g., the field timeInfoUTC providing the Coordinated Universal Time (UTC)) in a SIB, such as SIB9 in NR or SIB16 in E-UTRA. The client may set the clock based on the time information (e.g., the UTC time), for example, from the base station. In certain cases, the SIB(s) with time information may be provided at certain granularity (e.g., 10 ms). That is, the client may receive the time information from the base station on a periodic basis (e.g., every 10 ms). In certain cases, the base station may be synchronized with a separate clock source, such as PTP or one or more satellite based positioning systems.

In certain aspects, the information transmitted at 504 may be included in Session Description Protocol (SDP) signaling (e.g., as provided in RFC 7273 RTP Clock Source Signalling) for various real-time transfer protocols (RTP). For example, the information at 504 may indicate the clock source with a timestamp reference clock field (ts-refclk). The values for the timestamp reference clock field may include various values to indicate NTP, PTP, satellite based positioning systems, a local clock, or private clock as the reference clock, such as "ntp", "ptp", "gps", "gal", "glonass", "local", private", or "clksrc-ext". In certain cases, the value of "private" for the timestamp reference clock field may be used to indicate that the cellular clock is the clock source. In other cases, a separate value for the timestamp reference clock field (ts-refclk) may be used to represent the cellular clock as the clock source. In certain aspects, the information transmitted at 504 may indicate the cell identifier of a serving cell of the client, and accuracy of the clock source as a time value in the SDP signaling. For example, a sub-field of "cellular-cellID" may represent the cell identifier of the serving cell, and the sub-field of "cellular-accuracy" or "accuracy" may represent the accuracy of the clock source (e.g., 1 μs, 1 ms, or 10 ms). The cell identifier may be an enhanced cell identity (ECI) or a global cell identification such as a cell identity used to unambiguously identify a cell within a wireless network (e.g., a public land mobile network (PLMN)). In certain cases, the SDP signaling for the information at 504 may take the following form:

a=ts-refclk:private
a=ts-refclk:private=cellular-cellID:abc
a=ts-refclk:private=cellular-accuracy:1 ms where the value of "private" for ts-refclk indicates that the cellular clock is the clock source, the value of "abc" for cellular-cellID indicates the cell ID of the serving cell, and the value of "1 ms" for cellular-accuracy indicates the clock source has an accuracy of 1 millisecond.

In certain aspects, the information transmitted at 504 and/or the message transmitted at 506 may further indicate various other aspects of the wireless network. The aspects of the wireless network may allow the server to take various measures, such as adjusting the synchronization with the clock source of the client and/or adjusting the rate at which data is transmitted to the client, as further described herein with respect to FIG. 6. As an example, the information transmitted at 504 and/or the message transmitted at 506 may include a network identifier of a network serving the client, one or more neighboring cells of the serving cell and/or detected by the client (e.g., cell identifiers of the neighboring cells), a system frame number (SFN) in which the information is transmitted or corresponding to the timestamp, or a combination thereof. In certain cases, indices of other time-domain units (such as a subframe number, slot number, or symbol number) may be included with the SFN to provide additional resolution and/or accuracy, such that the time-domain of the physical layer provides a separate timestamp. For example, the message transmitted at 506 may indicate an index of a time-domain unit (such as a frame number, subframe number, slot number, or symbol number) or a combination of time-domain unit indices corresponding to the timestamp or the event associated with the data. The network identifier may be, for example, a mobile country code (MCC), mobile network code (MNC), PLMN (which includes the MCC and MNC), a base station identifier (such as an eNodeB identifier or a gNodeB identifier), or a combination thereof.

In certain aspects, the operations 500 may include the client performing a handover to a different cell and updating the server with the cell identifier of the new serving cell. For example, the operations 500 may further include the client handing over from the serving cell to a target cell. The client may transmit, to the server and based on the handing over, updated information indicating a cell identifier of the target cell and/or one or more neighboring cells of the target cell.

In certain aspects, the server may be providing various cloud-based services to the client, such as split XR, split rendering, split computation, cloud gaming, or the like. As an example, the generated data received at 508 may include one or more rendered video frames (e.g., video frames for the right eye and video frames for the left eye), audio streams, and/or instructions for haptic feedback, and the client may display the one or more rendered video frames, play the audio streams, and/or provide the haptic feedback. As examples, the video frames may be displayed on an HMD in a split XR setting or television screen in a cloud gaming setting, the audio stream may be played through headset speakers, and the haptic feedback may be vibrate a controller. In other cases, the generated data received at 508 may be instructions or data for an Internet-of-Things (IOT) device in which the server provides low-latency split computation based on sensor data measured by the IOT device.

Figure 6:
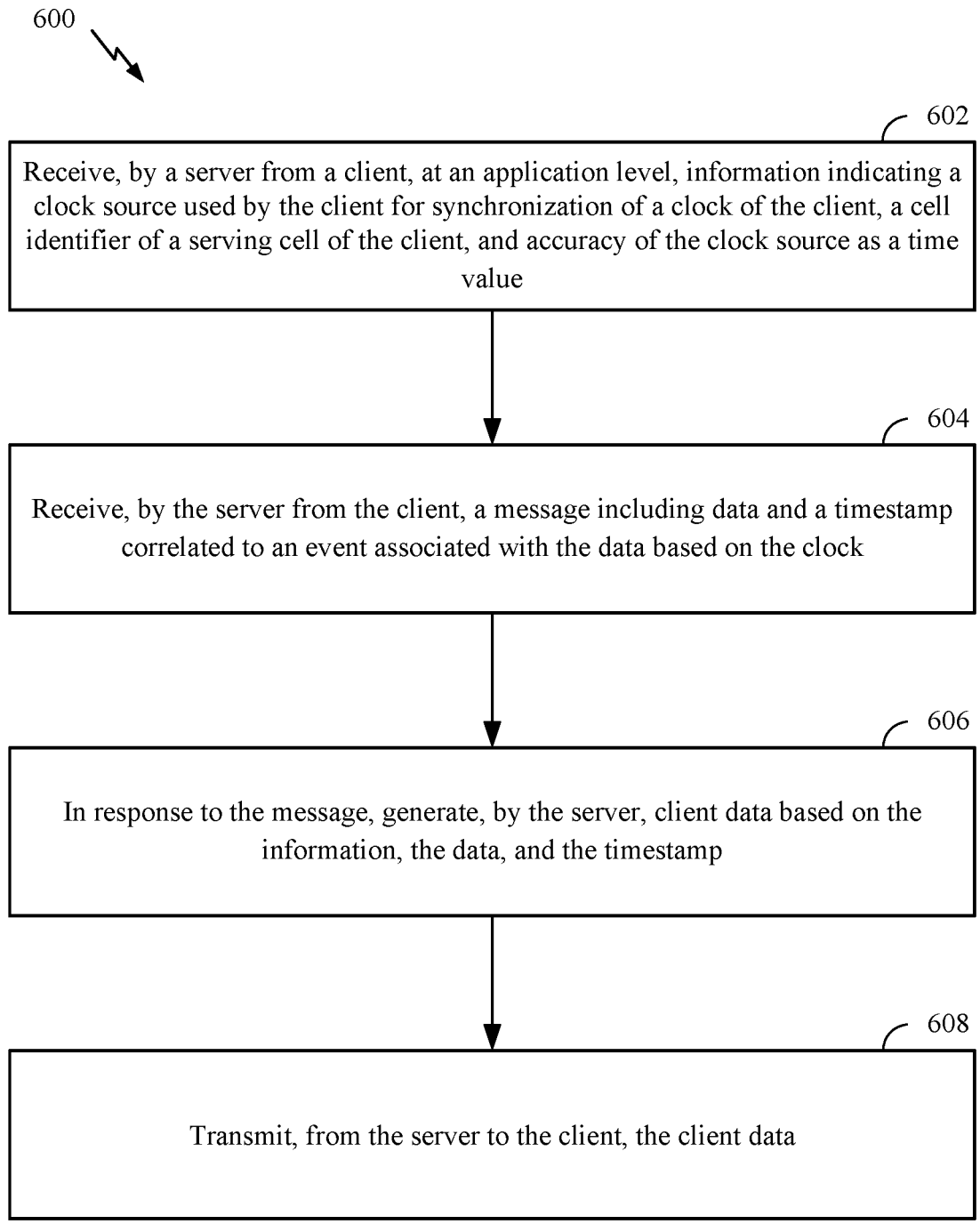
FIG. 6 is a flow diagram illustrating example operations for communicating time synchronized data between a client and a server by a server, in accordance with certain aspects of the present disclosure.

FIG. 6 is a flow diagram illustrating example operations 600 for communicating time synchronized data between a client and a server, in accordance with certain aspects of the present disclosure. The operations 600 may be performed, for example, by a server (e.g., the server 135 in the wireless communication network 100). The operations 600 may be complimentary to the operations 500 performed by the UE. The operations 600 may be implemented as software components that are executed and run on one or more processors (e.g., the processor 1104 of FIG. 11). Further, the transmission and reception of signals by the server in the operations 600 may be enabled, for example, by a network interface (e.g., the network interface 1108 of FIG. 11) through a wired or optical interface. In certain aspects, the transmission and/or reception of signals by the server may be implemented via a bus interface (e.g., the bus 1106 of FIG. 11) of one or more processors (e.g., the processor 1104) obtaining and/or outputting signals.

The operations 600 may begin at 602, where the server receives, from a client (e.g., the UE 120a), at an application level, information indicating a clock source used by the client for synchronization of a clock of the client, a cell identifier of a serving cell of the client, and an accuracy of the clock source as a time value. At 604, the server may receive, from the client, a message including data and a timestamp correlated to an event associated with the data based on the clock of the client. At 606, the server may generate, in response to the message, client data based on the information, the data, and the timestamp. At 608, the server may transmit, to the client, the client data.

In certain aspects, the server may be a computer, computing device, or processing system that provides a service (e.g., split XR rendering of video frames, audio streams, and/or haptic feedback) to the client. In certain aspects, the server may be a program, process, or thread running on the computer, computing device, or processing system.

The clock source may be various reference clocks that provide time information, for example, as described herein with respect to operations 500. For example, the clock source may be one of a satellite based positioning system (e.g., GPS, GLONASS, or Galileo), a cellular clock, a PTP, or NTP.

In certain aspects, the operations 600 may further include the server synchronizing a server clock of the server with the clock source. In certain cases, synchronization of the server clock with the clock source may involve the server deriving its timing based on the same reference clock as the clock source of the client or based on a reference clock with the same accuracy or a higher level of accuracy as the clock source of the client. For example, the server and client may rely on the same underlying reference clock, such as a satellite based positioning system or a time server (e.g., PTP/NTP), for timing as further described herein with respect to FIG. 8. In certain cases, the client may receive time information for the clock source from a base station, which derives the time information from a satellite based positioning system or a time server, and the server may use a satellite based positioning system or a time server as a reference clock with the same level or higher level of accuracy as the clock source of the client.

In certain aspects, the information received at 602 and/or the message received at 604 may be included in SDP signaling as described herein with respect to the operations 500. In certain cases, the information received at 602 and/or the message received at 604 may further indicate one or more of a network identifier of a network serving the client, one or more neighboring cells of the serving cell or detected by the client, and a system frame number (SFN) in which the information is transmitted or corresponding to the timestamp. For example, the network identifier or serving cell identifier may enable the server to use and/or determine common clock synchronization across clients from the same serving cell and/or network. As another example, the network identifier or serving cell identifier may enable the server to adjust a processing profile (e.g., latency, downlink throughput, frames per second (FPS), frame resolution, audio sampling rate, video codec, audio codec, etc.) across clients from the same serving cell and/or network. In certain cases, the network identifier or serving cell identifier may enable the server to spread out the downlink data of multiple clients over time in order to prevent or reduce overloading the network capacity of the serving cell or network.

In certain aspects, the SFN may correspond to an index of a radio frame in a sequence of radio frames, for example, as described herein with respect to FIG. 3. The server may use the SFN in conjunction with the timestamps based on cellular time, for example, in cases where the cellular time accuracy is greater than or equal to a certain threshold (e.g., ≥10 ms). That is, the SFN may provide an additional or separate reference point for the server to synchronize with the client. Expressed another way, the SFN, and in certain cases indices of other time-domain units, may serve as a supplemental or separate timestamp at various levels of resolution (e.g., 10 ms at the frame level, 1 ms at the subframe level, or sub-1 ms at the slot or symbol levels). For example, indices of other time-domain units (such as a subframe number, slot number, or symbol number) may be included with the SFN to provide additional resolution and/or accuracy, such that the time-domain of the physical layer provides a separate timestamp. In certain cases, the message received at 604 may indicate an index of a time-domain unit (such as a frame number, subframe number, slot number, or symbol number) or a combination of time-domain unit indices corresponding to the timestamp or the event associated with the data.

In certain cases, knowledge of the neighboring cells may enable the server to prepare for various handover scenarios between the client and the neighboring cells. For instance, the server may be able to determine a processing profile (e.g., latency, downlink throughput, FPS, frame resolution, audio sampling rate, video codec, audio codec, etc.) for the neighboring cell, for example, from other clients communicating with the server via the neighboring cell. In certain cases, the server may be able to determine available downlink throughput over time to the neighboring cells.

In certain aspects, the operations 600 may include the server receiving, from the client, updated information indicating a cell identifier of a target cell to which the client has handed over and/or one or more neighboring cells of the target cell. For example, after the client hands over to the target cell, the client may update the server with the new serving cell, and the server may assign certain processing resources and/or downlink throughput to the client over time with respect to other clients communicating with the server via the target cell.

In certain aspects, the server may be providing various cloud-based services to the client, such as split XR, split rendering, split computation, cloud gaming, or the like. For example, the data received at 604 may include various input (such as pose information, controller input, and/or sensor measurements) used by the server to update the generated data. In certain cases, the data received at 604 may include position data of the client. That is, the data received at 604 may include pose information such as the orientation of the user's head in an XR setting. In certain cases, the generating the client data at 606 may include rendering one or more video frames (e.g., video frames for the right eye and video frames for the left eye), generating audio streams, and/or generating haptic feedback.

In certain cases, the server may use the timestamp to generate the client data at 606. For example, rendering the one or more video frames may include determining a positioning of objects in the one or more video frames based on the timestamp. As objects in the virtual world may be in motion or initiated in motion by certain events (such as controller input), the server may determine the position of the objects in the virtual world based on the timestamps from the client. For example, suppose the virtual world is simulating a golf game, where the client provides timestamps for controller input which corresponds to the position of a golf club. When the virtual golf club hits a golf ball, the server may determine the position of the golf ball relative to the timestamps provided by the client for the controller input.

Figure 9A:
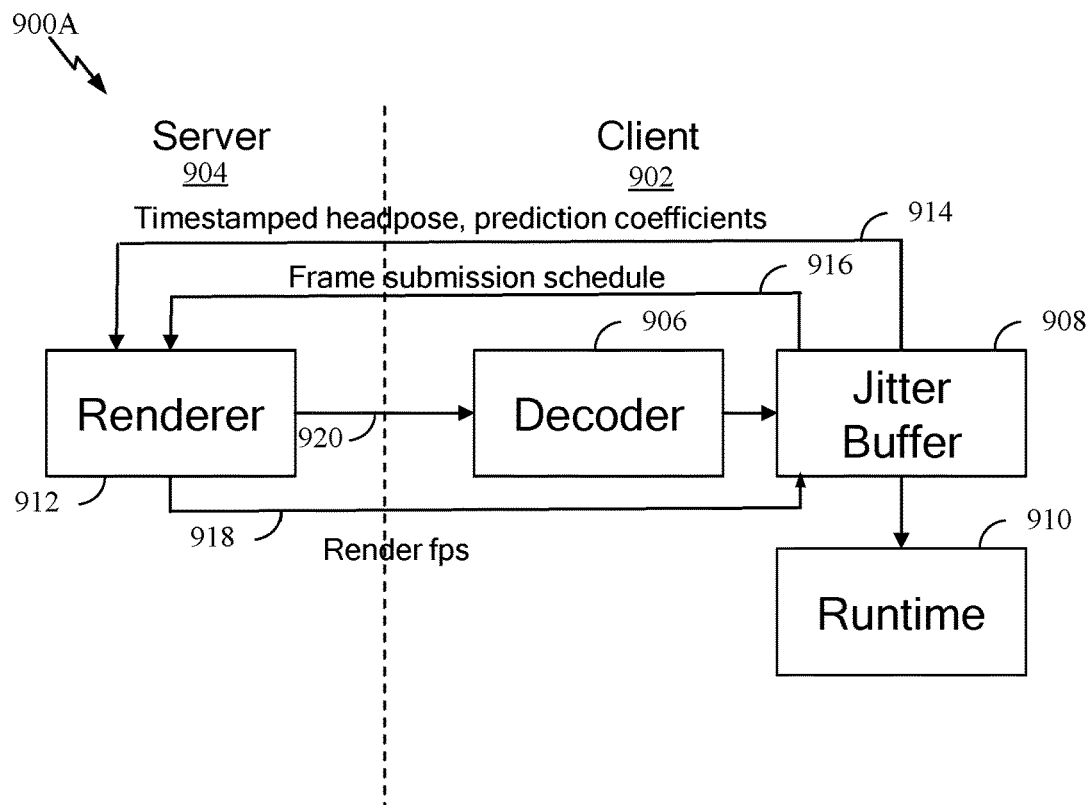
FIG. 9A is a diagram illustrating an example cloud-based service in which a runtime at a client is synchronized with a server, in accordance with certain aspects of the present disclosure.
Figure 9B:
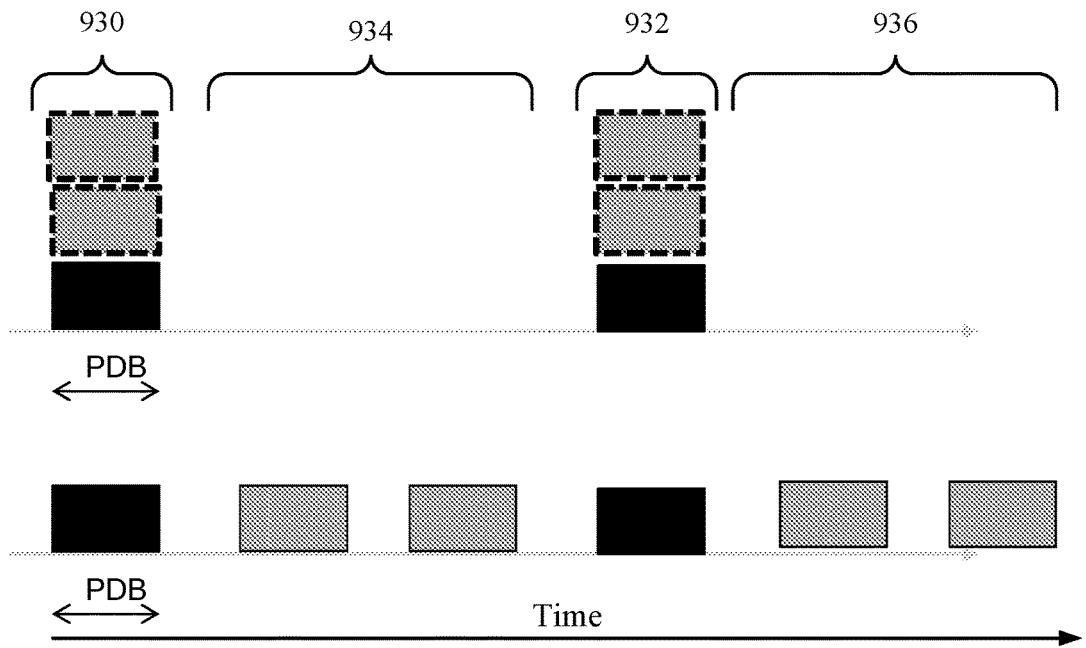
FIG. 9B is a diagram illustrating an example of resource allocation of a server over time, in accordance with certain aspects of the present disclosure.

In certain aspects, the server may spread various resources (e.g., computational resources or network traffic capacity) over time based on the timestamps of the messages received from the client, as further described herein with respect to FIG. 9B. For example, generating the client data at 606 may include the server initiating generating of the client data at a certain time based on the timestamp. That is, the server may shift the time at which the generation of the client data at 606 is performed (e.g., advancing or delaying the generation of client data) until a certain time based on the timestamp. As an example, the server may select a render time for video frames based on a shifted target display time, for example, to reduce the motion-to-render-to-photon time between the client and server in a split XR setting. This way, the frame that is rendered by the server may have a desirable motion-to-render-to-photon time (e.g., the shortest duration between the client and server). In certain cases, shifting the time at which the generation of the client data is performed may allow the server to provide services to other users as the various resources (e.g., computational resources or network traffic capacity) become available to the client. In certain cases, the operations 600 may further include the server receiving corresponding information from one or more additional clients, and the generation of client data at 606 may include the server initiating generating of the client data at a time based on each corresponding timestamp of each of the one or more additional clients. That is, as the server receives information from other clients, the server may determine when to generate the client data at 606 based on the server load (e.g., processing load and/or network capacity) due to other clients.

With respect to network traffic capacity, the transmission of the client data at 608 may be spread over time based on the timestamps received by the client and/or other clients. For example, transmitting the client data at 608 may be performed at a certain time based on the timestamp. That is, the server may generate the client data and adjust when the client data is transmitted at 608 until a certain time based on the timestamp. Adjusting when the client data is transmitted (e.g., advancing or delaying the transmission of the client data) may allow the server to provide services to other users as network traffic capacity becomes available to the client across the various wired/wireless networks en route to the client. As an example, adjusting when the client data is transmitted may prevent the RAN from getting overwhelmed with data in a buffer or reduce the network traffic to the RAN. In certain cases, the operations 600 may further include the server receiving corresponding information from one or more additional clients, and transmitting the client data at 608 may be performed at a certain time based on each corresponding timestamp of each of the one or more additional clients. That is, as the server receives information from other clients and/or sends data to the other clients, the server may determine when to transmit the client data at 608 based on the network traffic capacity due to other clients.

Figure 7:
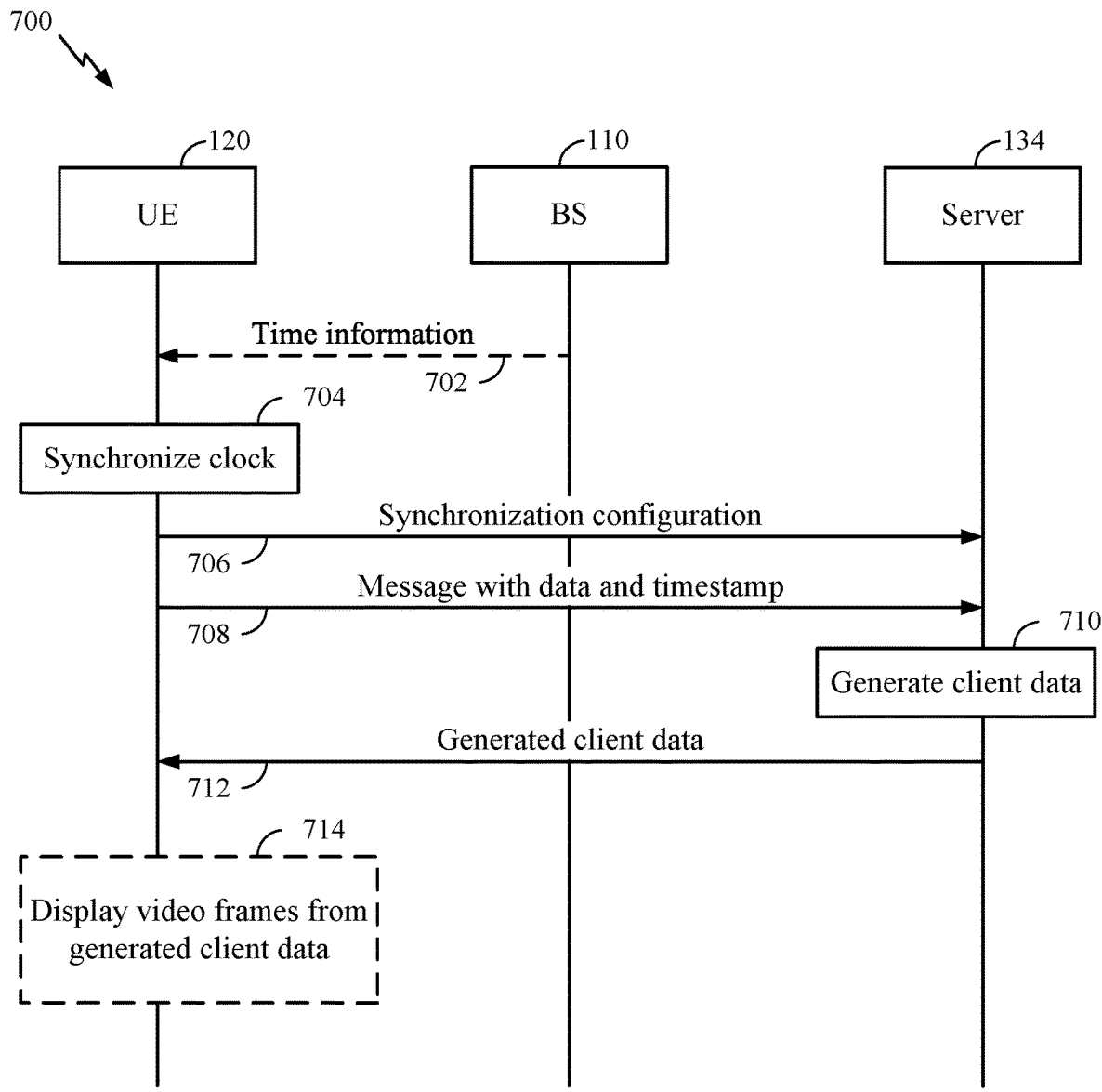
FIG. 7 is a signaling flow diagram illustrating example operations for providing end-to-end synchronization between a client and server, in accordance with certain aspects of the present disclosure.

FIG. 7 is a signaling flow diagram illustrating example operations 700 for providing end-to-end synchronization between a client and server, in accordance with certain aspects of the present disclosure. In certain cases, the UE 120 may receive time information from the BS 110, for example, a SIB with a time field, such as SIB9 or SIB16. At 704, the UE 120 may synchronize a clock of the client with a clock source, such as the time information received at 602. In other cases, the UE 120 may synchronize with other clock sources, such as PTP, NTP, or a satellite based positioning system. At 706, the UE 120 may transmit, to the server 134, a synchronization configuration, which indicates the timestamp clock source (e.g., NTP, PTP, satellite based positioning system, or cellular clock), a cell ID of the serving cell (e.g., the BS 110) of the client, and the accuracy of the clock source. For example, the UE 120 may transmit, over the air (e.g., frequency-time resources), the synchronization configuration to the BS 110, which forwards the synchronization configuration to the server 134. At 708, the UE 120 may transmit, to the server 134, a message with data and a timestamp correlated to an event associated with the data, such as a transmission time of the message based on the clock or correlated to when the data is generated by the UE 120. At 710, the server may generate client data based on the information, the data, and the timestamp. For example, the server may render video frames, audio streams, and/or haptic feedback instructions for the UE 120. At 712, the server 134 may transmit the client data to the UE 120. For example, the server 134 may send the client data to the BS 110 via network interface, such as a wired or optical interface, and the BS 110 may forward the client data to the UE 120 over the air. The UE 120 may take one or more actions based on the client data. For example, at 714, the UE 120 may display video frames with a HMD from the generated client data.

Figure 8:
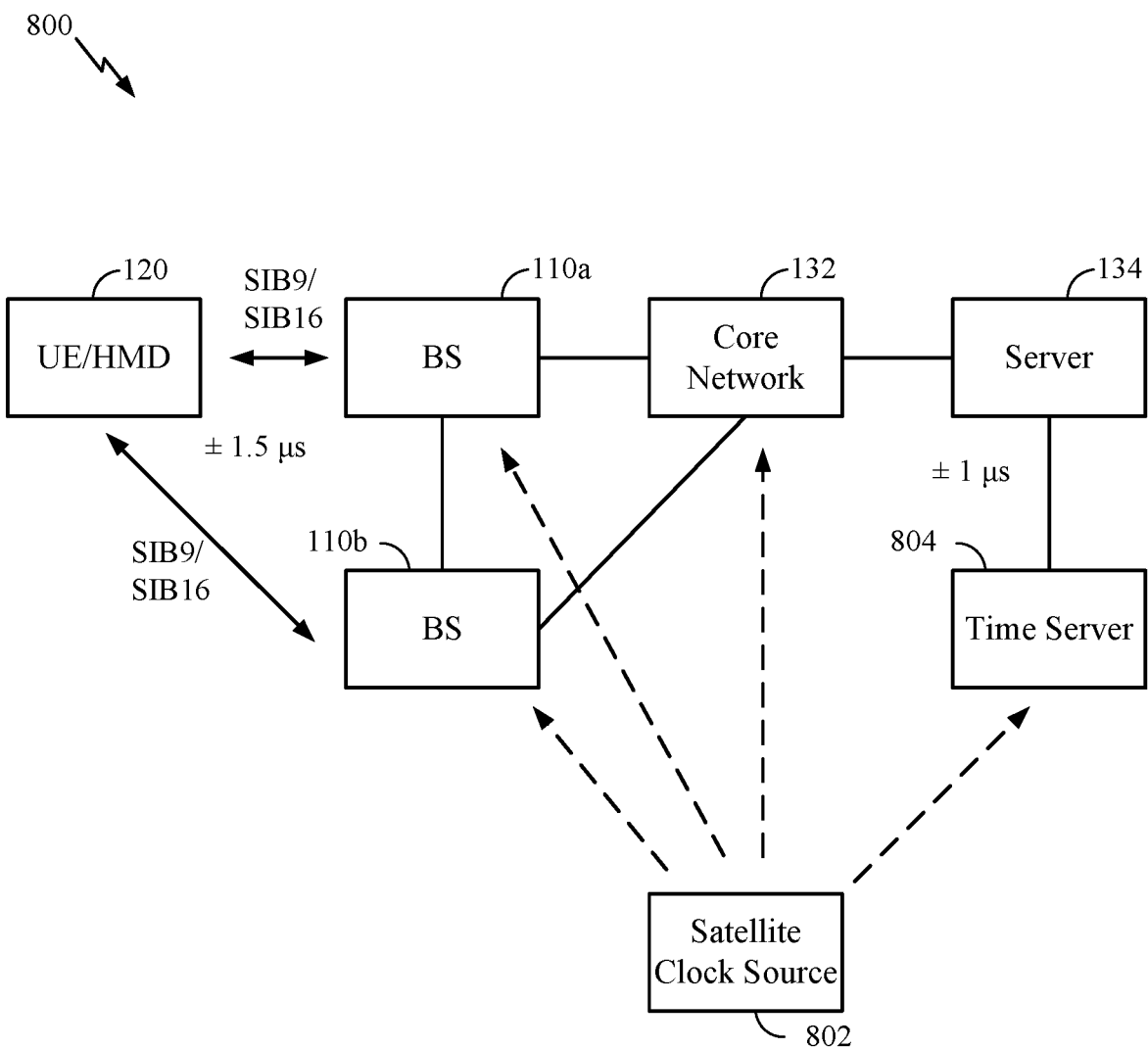
FIG. 8 is a diagram of an example communications network in which a server and client are synchronized, in accordance with certain aspects of the present disclosure.

FIG. 8 is a diagram of an example communications network 800 in which a server 134 and client (e.g., the UE 120) are synchronized, in accordance with certain aspects of the present disclosure. In this example, the UE 120 may obtain time information from the RAN (e.g., BS 110a and/or BS 110b), and the RAN may synchronize with various clock sources, such as PTP (not shown) and/or a satellite based positioning system 802. That is, the time information, received by the UE 120 from the RAN, may be derived from various reference clocks such as the satellite based positioning system 802 and/or PTP. In certain cases, the core network 132 may synchronize with various clock sources such as the satellite based positioning system 802. The server 134 may be synchronized with various clock sources such as a time server 804 (e.g., a PTP or NTP server), which may derive time information from the satellite based positioning system 802. As described herein, the UE 120 may send timestamps with various messages to the server 134, which may synchronize with the timestamps based on a reference clock, such as the time server 804. In certain cases, synchronization between the UE 120 and the server 134 may involve the UE 120 and the server 134 relying the same reference clock (such as the satellite based positioning system 802) for time information used in the cloud-based service (e.g., split XR).

As an example, suppose the UE 120 is camped on BS 110a as the serving cell, and the UE 120 hands over to the BS 110b as a target cell. In certain cases, the UE 120 may send updated information relating to the timestamps to the server 134. For example, the UE 120 may send updated information indicating a cell identifier of the new serving cell (e.g., BS 110b) and/or one or more neighboring cells of the new serving cell.

In certain aspects, the timestamps from the client may enable the server to indicate when the frames are to be displayed at the client. FIG. 9A is a diagram illustrating an example cloud-based service 900A in which a runtime at a client 902 is synchronized with a server 904, in accordance with certain aspects of the present disclosure. As shown, the client 902 may include a decoder 906, a jitter buffer 908, and a runtime module 910, and the server 904 may include a render 912. The client 902 sends pose information 914 (e.g., prediction coefficients and a timestamp correlated with when the pose information is generated at the client) to the server 904. The renderer 912 may generate frames based on the pose information 914 and send the rendered frames 920 to the client 902. The decoder 906 may decode the rendered frames 920 according to a certain codec, such as h.265 or VP9, and send the decoded frames to the jitter buffer 908. The jitter buffer 908 may temporarily store the decoded frames until a certain frame is to be displayed at the runtime module 910.

In certain aspects, the client 902 may send, to the server 904, a frame submission schedule 916 indicating the schedule of the jitter buffer 908 and the time at which a frame is being submitted to the server 904 for rendering. That is, the jitter buffer 908 indicates its schedule and which frame was submitted at what time to the renderer 912. The frame submission schedule 916 allows the renderer 912 to know when a frame that is being rendered by the renderer 912 is expected by the jitter buffer 908.

The jitter buffer 908 may include logic that schedules frames to be submitted to the runtime module 910 based on a render FPS 918 and the refresh rate of the display. For example, the jitter buffer 908 may ensure each frame is displayed twice when the render FPS 918 is at 45 FPS and display refresh rate is at 90 Hz. That is, the rendered frames 920 may provide a sequence of frames at 45 FPS, and with the display refresh rate at 90 Hz, the jitter buffer 908 may display each of the rendered frames 920 twice within a second to maintain 90 FPS at the display. In certain aspects, the frame submission by the jitter buffer 908 may be synchronized with the refresh rate of the display at the runtime module 910. For example, the frame submission may be synchronized to the vertical sync (VSync) of the display.

In certain cases, the renderer 912 may use the incoming pose information 914 (e.g., current pose orientation and pose prediction coefficients) to target a certain time-instant when the current frame is going to be displayed at the runtime module 910. The server may account for any delay in rendering relative to when the pose information 914 arrived at the server 904.

In certain aspects, the timestamps received at the server may enable the server to schedule various resources for processing and/or network traffic. For example, FIG. 9B is a diagram illustrating an example of resource allocation of a server over time, in accordance with certain aspects of the present disclosure. In this example, the server may have a first set of resources 930 (e.g., computational resources and/or network traffic) allocated to multiple clients within a first time period and a second set of resources 932 allocated to multiple client within a second time period. The server may have other time periods 934, 936 available for allocation of resources to other clients.

While the various examples are described herein with respect to split XR applications to facilitate understanding, aspects of the present disclosure may also be applied to various other cloud-based or edge-based services, such as cloud-gaming, split rendering, and/or split computation.

Figure 10:
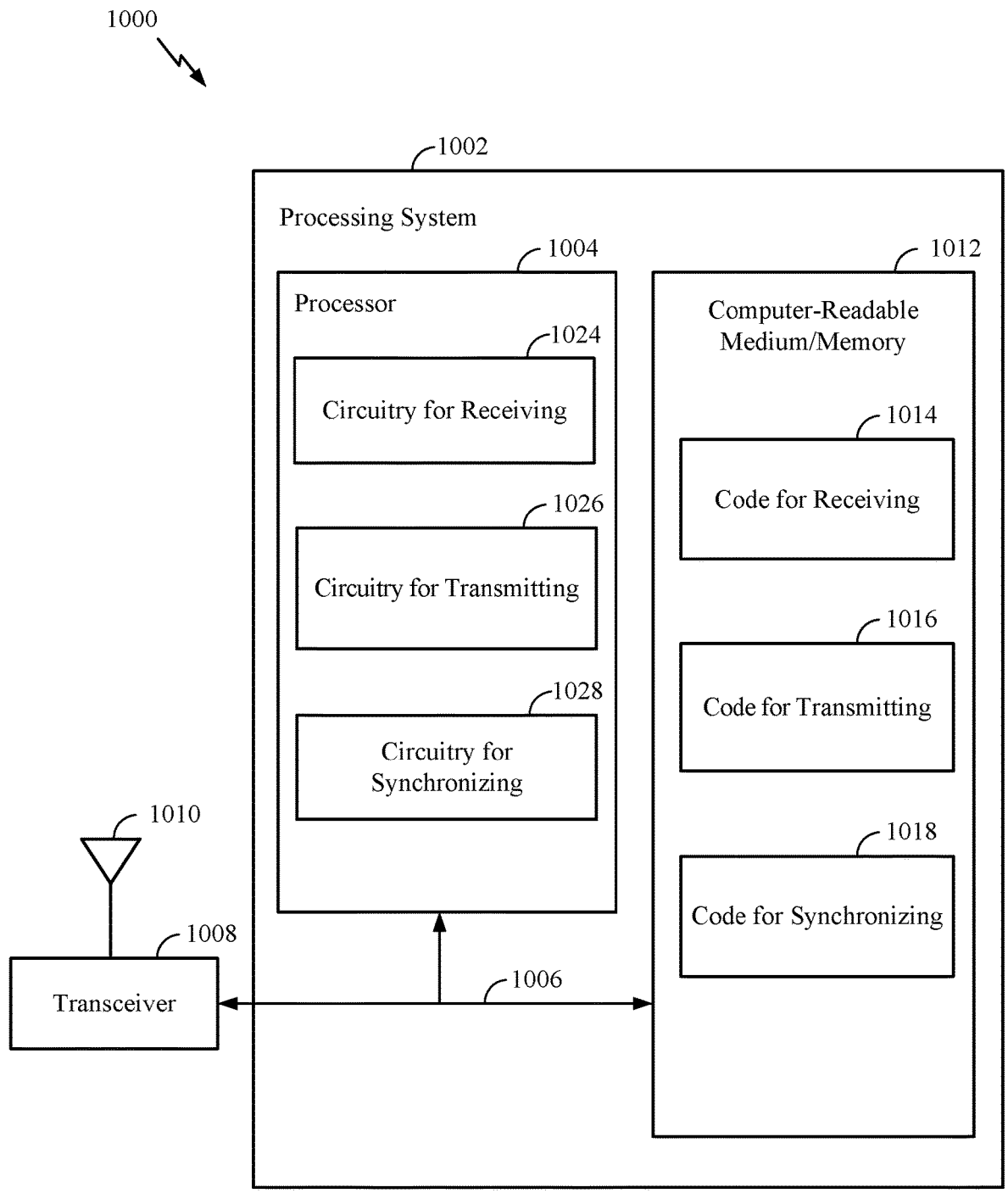
FIG. 10 illustrates a communications device (e.g., a UE) that may include various components configured to perform operations for the techniques disclosed herein in accordance with aspects of the present disclosure.

FIG. 10 illustrates a communications device 1000 (e.g., the UE 120) that may include various components (e.g., corresponding to means-plus-function components) configured to perform operations for the techniques disclosed herein, such as the operations illustrated in FIG. 5. The communications device 1000 includes a processing system 1002 coupled to a transceiver 1008 (e.g., a transmitter and/or a receiver). The transceiver 1008 is configured to transmit and receive signals for the communications device 1000 via an antenna 1010, such as the various signals as described herein. The processing system 1002 may be configured to perform processing functions for the communications device 1000, including processing signals received and/or to be transmitted by the communications device 1000.

The processing system 1002 includes a processor 1004 coupled to a computer-readable medium/memory 1012 via a bus 1006. In certain aspects, the computer-readable medium/memory 1012 is configured to store instructions (e.g., computer-executable code) that when executed by the processor 1004, cause the processor 1004 to perform the operations illustrated in FIG. 5, or other operations for performing the various techniques discussed herein for synchronization between a client and server. In certain aspects, computer-readable medium/memory 1012 stores code for receiving 1014, code for transmitting 1016, and/or code for synchronizing. In certain aspects, the processor 1004 has circuitry configured to implement the code stored in the computer-readable medium/memory 1012. The processor 1004 includes circuitry for receiving 1024, circuitry for transmitting 1026, and/or circuitry for synchronizing.

Figure 11:
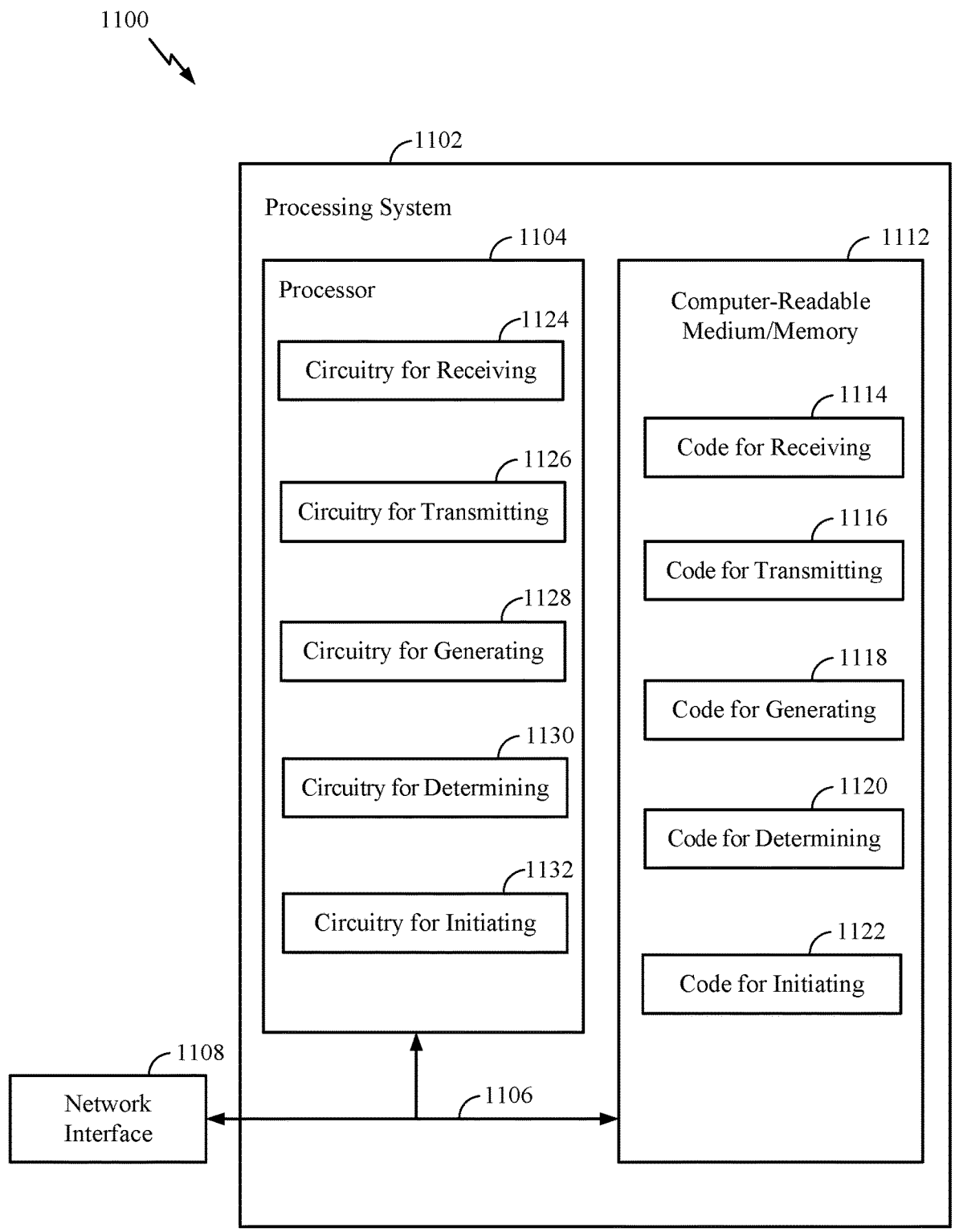
FIG. 11 illustrates a communications device (e.g., a server) that may include various components configured to perform operations for the techniques disclosed herein in accordance with aspects of the present disclosure.

FIG. 11 illustrates a communications device 1100 (e.g., the server 134) that may include various components (e.g., corresponding to means-plus-function components) configured to perform operations for the techniques disclosed herein, such as the operations illustrated in FIG. 6. The communications device 1100 includes a processing system 1102 coupled to a network interface 1108. The network interface 1108 is configured to transmit and receive signals for the communications device 1100 via a wired or optical interface, such as the various signals as described herein. As an example, the network interface 1108 may be in communication with one or more base stations, such as the base station 110. The processing system 1102 may be configured to perform processing functions for the communications device 1100, including processing signals received and/or to be transmitted by the communications device 1100. The network interface 1108 may be coupled to the processing system via a bus 1106.

The processing system 1102 includes a processor 1104 coupled to a computer-readable medium/memory 1112 via the bus 1106. In certain aspects, the computer-readable medium/memory 1112 is configured to store instructions (e.g., computer-executable code) that when executed by the processor 1104, cause the processor 1104 to perform the operations illustrated in FIG. 6, or other operations for performing the various techniques discussed herein for synchronizing between a client and server. In certain aspects, computer-readable medium/memory 1112 stores code for receiving 1114, code for transmitting 1116, code for generating 1118, code for determining 1120, and/or code for initiating 1122. In certain aspects, the processor 1104 has circuitry configured to implement the code stored in the computer-readable medium/memory 1112. The processor 1104 includes circuitry for receiving 1124, circuitry for transmitting 1126, circuitry for generating 1128, circuitry for determining 1130, and/or circuitry for initiating 1132.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 5-7.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for communicating time synchronized data between a client and a server, the method comprising:
   synchronizing, by a client, a clock of the client with a clock source;
   transmitting, from the client to a server, at an application level, information indicating:
     the clock source;
     a cell identifier of a serving cell of the client; and
     accuracy of the clock source as a time value;
   transmitting, from the client to the server, a message including data and a timestamp correlated to an event associated with the data based on the clock; and
   in response to the message, receiving, by the client from the server, generated data.

2. The method of claim 1, wherein the clock source is one of:
   a satellite based positioning system,
   a cellular clock,
   a precision time protocol, or
   a network time protocol.

3. The method of claim 1, wherein the clock source is a cellular clock, and wherein synchronizing the clock comprises:
   receiving, by the client from a base station, time information based on the base station being time synchronized with the server; and
   setting the clock based on the time information.

4. The method of claim 1, wherein the information further indicates two or more of:
   a network identifier of a network serving the client;
   one or more neighboring cells of the serving cell; or
   a system frame number in which the information is transmitted.

5. The method of claim 1, wherein the message indicates an index of a time-domain unit corresponding to the timestamp.

6. The method of claim 1, further comprising:
   handing over, by the client, from the serving cell to a target cell; and
   based on the handing over, transmitting, from the client to the server, updated information indicating:
     a cell identifier of the target cell; and
     one or more neighboring cells of the target cell.

7. The method of claim 1, wherein the generated data comprises one or more rendered video frames, and further comprising displaying, by the client, the one or more rendered video frames.

8. A method for communicating time synchronized data between a client and a server, the method comprising:
   receiving, by a server from a client, at an application level, information indicating:
     a clock source used by the client for synchronization of a clock of the client;
     a cell identifier of a serving cell of the client; and
     accuracy of the clock source as a time value;
   receiving, by the server from the client, a message including data and a timestamp correlated to an event associated with the data based on the clock;
   in response to the message, generating, by the server, client data based on the information, the data, and the timestamp; and
   transmitting, from the server to the client, the client data.

9. The method of claim 8, wherein the clock source is one of:
   a satellite based positioning system,
   a cellular clock,
   a precision time protocol, or
   a network time protocol.

10. The method of claim 8, further comprising synchronizing a server clock of the server with the clock source.

11. The method of claim 8, wherein the information further indicates two or more of:
    a network identifier of a network serving the client;
    one or more neighboring cells of the serving cell; or
    a system frame number in which the information is transmitted.

12. The method of claim 8, wherein the message indicates an index of a time-domain unit corresponding to the timestamp.

13. The method of claim 8, further comprising receiving, by the server from the client, updated information indicating:
    a cell identifier of a target cell to which the client has handed over; and
    one or more neighboring cells of the target cell.

14. The method of claim 8, wherein the data comprises position data of the client.

15. The method of claim 8, wherein generating the client data comprises rendering one or more video frames.

16. The method of claim 15, wherein rendering the one or more video frames comprises:
    determining a positioning of objects in the one or more video frames based on the timestamp.

17. The method of claim 8, wherein generating the client data comprises:
    initiating generating of the client data at a time based on the timestamp.

18. The method of claim 8, further comprising receiving corresponding information from one or more additional clients, wherein generating the client data comprises:
    initiating generating of the client data at a time based on each corresponding timestamp of each of the one or more additional clients.

19. The method of claim 8, wherein transmitting the client data is performed at a time based on the timestamp.

20. The method of claim 8, further comprising receiving corresponding information from one or more additional clients, wherein transmitting the client data is performed at a time based on each corresponding timestamp of each of the one or more additional clients.

21. An apparatus for communicating time synchronized data between the apparatus and a server, the apparatus comprising:
one or more processors configured to synchronize a clock of the apparatus with a clock source;
memory coupled to the one or more processors;
a transmitter configured to:
transmit, to a server, at an application level, information indicating:
the clock source,
a cell identifier of a serving cell of the apparatus, and
accuracy of the clock source as a time value; and
transmit, to the server, a message including data and a timestamp correlated to an event associated with the data based on the clock; and
a receiver configured to receive, in response to the message from the server, generated data.

22. An apparatus for communicating time synchronized data between a client and the apparatus, the apparatus comprising:
a receiver configured to:
receive, from a client, at an application level, information indicating:
a clock source used by the client for synchronization of a clock of the client,
a cell identifier of a serving cell of the client, and
accuracy of the clock source as a time value; and
receive, from the client, a message including data and a timestamp correlated to an event associated with the data based on the clock;
one or more processors configured to generate, in response to the message, client data based on the information, the data, and the timestamp;
memory coupled to the one or more processors; and
a transmitter configured to transmit, to the client, the client data.

23. An apparatus for communicating time synchronized data between the apparatus and a server, the apparatus comprising:
means for synchronizing, by the apparatus, a clock of the apparatus with a clock source;
means for transmitting, from the apparatus to a server, at an application level, information indicating:
the clock source;
a cell identifier of a serving cell of the apparatus; and
accuracy of the clock source as a time value;
means for transmitting, from the apparatus to the server, a message including data and a timestamp correlated to an event associated with the data based on the clock; and
means for receiving, in response to the message, by the apparatus from the server, generated data.

24. An apparatus for communicating time synchronized data between a client and the apparatus, the apparatus comprising:
means for receiving, by the apparatus from a client, at an application level, information indicating:
a clock source used by the client for synchronization of a clock of the client;
a cell identifier of a serving cell of the client; and
accuracy of the clock source as a time value;
means for receiving, by the apparatus from the client, a message including data and a timestamp correlated to an event associated with the data based on the clock;
means for generating, in response to the message, by the apparatus, client data based on the information, the data, and the timestamp; and
means for transmitting, from the apparatus to the client, the client data.

25. A non-transitory computer readable medium having instructions stored thereon for:
synchronizing, by a client, a clock of the client with a clock source;
transmitting, from the client to a server, at an application level, information indicating:
the clock source;
a cell identifier of a serving cell of the client; and
accuracy of the clock source as a time value;
transmitting, from the client to the server, a message including data and a timestamp correlated to an event associated with the data based on the clock; and
in response to the message, receiving, by the client from the server, generated data.

26. A non-transitory computer readable medium having instructions stored thereon for:
receiving, by a server from a client, at an application level, information indicating:
a clock source used by the client for synchronization of a clock of the client;
a cell identifier of a serving cell of the client; and
accuracy of the clock source as a time value;
receiving, by the server from the client, a message including data and a timestamp correlated to an event associated with the data based on the clock;
in response to the message, generating, by the server, client data based on the information, the data, and the timestamp; and
transmitting, from the server to the client, the client data.

* * * * *